Patented Feb. 2, 1954

2,668,172

UNITED STATES PATENT OFFICE 2,668,172

CASTOR OIL SOLUBLE COLORING COMPOSITION FOR COATING COPYING PAPER

Luther C. Chien, Pitman, N. J., assignor to E. I. du Pont de Nemours and Company, Wilmington, Del., a corporation of Delaware No Drawing. Application July 16, 1952, Serial No. 299,239

4 Claims. (Cl. 260—388)

This invention relates to an improved color of the victoria blue series. More particularly, this invention deals with Victoria Pure Blue BOC, which is a castor-oil soluble triaryl methane color, of particular interest in the manufacture of duplicating papers (so-called "carbon papers").

It is an object of this invention to provide the above color in a form which is characterized by solubility in water, solubility in castor oil and stability to crystal growth in hot castor oil. Additional objects and achievements of this invention will appear as the description proceeds.

Victoria Pure Blue BOC is a castor-oil soluble grade of Victoria Pure Blue BO, which in turn is defined in U. S. P. 2,519,210 as a dyestuff which is essentially the hydrochloride of tetraethyl-di-amino - diphenyl - ethyl - alpha - amino - naphthyl-methane. The castor-oil soluble grade is obtained by controlling the manufacture of said color so as to leave in it not less than 1.00 and not more than 1.10 HCl units per molecule. In other words, the BOC grade is represented by the general formula $$[B] \cdot (HCl)_x$$

wherein [B] represents the organic nucleus of the color, while the subscript $x$ is a number not less than 1.00 and not greater than 1.10. Further details on the manufacture of this color may be found in U. S. P. 2,422,445.

The importance of solubility in castor oil springs from the fact that in the manufacture of copying papers (so-called "carbon papers") it has become customary in recent years to employ castor oil as the vehicle for preparing the colored coating for the paper.

As pointed out in U. S. P. 2,519,210, Victoria Pure Blue BOC has a strong tendency to crystallize out of hot castor oil upon standing. Such tendency is noxious to the copying paper maker, inasmuch as it is the custom to prepare a coating ink, by heating the various ingredients in castor oil to about 190°–210° F., and to keep the mixture hot for several hours while it is being gradually consumed in the coating of paper. But if the dye crystallizes out, the coating ink becomes viscous and grainy, and will not spread uniformly and smoothly over the paper.

In the said patent, the remedy was suggested to incorporate into said color glycerine, or some other polyhydroxy compound from a specified group, to an extent of 2 to 6% by weight based on the weight of the dry color. This remedy is good as far as it goes; it is often, however, difficult to achieve proper control of proportions. Because of the tarry nature of the color obtained in the salting out step of its manufacture, it is difficult to obtain uniform incorporation of glycerine therein when manufactured in a large mass. Again, if any of the glycerine is lost, for instance by evaporation during the drying step, and if further quantities thereof are then added in compensation, the total quantity in the color may, through error in judgment, exceed or fall short of the limits prescribed in said patent. On the other hand, it has been found that excessive quantities of glycerine tend to induce sludge formation in the hot castor oil, whereas insufficient quantities may not successfully hinder crystal growth if the hot castor oil solution is allowed to stand for several hours.

The exact nature of the sludge and the reason for its formation are not clearly understood. Often, sludge will form in the total absence of glycerine. An excess of the latter, however, does seem to have an encouraging effect on the formation of this sludge. The presence of such sludge in the castor-oil solution of the color is objectionable, because it causes the solution to become viscous and leads to uneven coatings upon the copying papers made therefrom.

Now according to this invention, the problem of stability against crystal growth and that of sludge formation are both solved neatly by employing as stabilizing agent, in lieu of glycerine, the sodium salt of dibutyl-o-phenyl-phenol-disulfonic acid. The latter compound is a reaction product n-butyl alcohol, fuming sulfuric acid and o-hydroxy-diphenyl, and is described more fully in U. S. P. 2,135,978, wherein it is referred to as dibutylated disulfonated ortho hydroxy diphenyl. Its principal advantage for the purpose of the present invention resides in the fact that it may be used in excessive quantities without producing sludge or other observable harmful effects in the castor-oil solution of the color. Of course, excessively high proportions of this agent will act as a diluent upon the color, and are undesirable from this angle. But within the practical limits of say 4 to 20% by weight, based on the calculated dry weight of the color, the agent is very effective in achieving the aforementioned results, to wit, stabilizing the hot solution against crystal growth, without producing sludge.

Without limiting my invention, the following examples are given to illustrate my preferred mode of operation. Parts mentioned are by weight.

Example 1

100 parts by weight of Victoria Pure Blue BOC (dry basis) obtained as a wet tar by salting the dye solution as described in Example 1 of U. S. P. 2,422,445, were mixed with 4 parts by weight of dibutyl-o-phenyl-phenol di(sodium sulfonate) (prepared as described in U. S. P. 2,135,978, page 1, column 2, lines 5-35) and the mixture was dried by heating in vacuo at 80° C.

For testing, 2 parts of the above dye were ground, mixed with 10 parts of castor oil and heated at 90° C. for 20 hours. No appreciable growth of color crystals was observed. The solution remained smooth and free flowing.

Similar results were obtained when the same additive was employed to the extent of 5% based on the weight of the color.

For comparison, a similar castor oil solution was prepared using Victoria Pure Blue BOC which had not been treated with dibutyl-o-phenyl-phenol di(sodium sulfonate). In this case, abundant growth of crystals was observed in the castor oil and the mixture became viscous and grainy.

Example 2

The procedure of Example 1 was repeated except that the quantity of dibutyl-o-phenyl-phenol di(sodium sulfonate) was increased to 20 parts by weight. The stabilized dye obtained in this manner did not grow crystals or from sludge when heated in castor oil.

It is remarkable in this connection, that many other common wetting, cleansing or penetrating agents having $SO_3Na$ groups do not have this valuable effect upon hot solutions of the mentioned color in castor oil. As instances of such other surface active agents tested by me, but yielding negative results, may be mentioned a sulfonated aliphatic hydrocarbon ($C_{12-13}$; sodium salt); sulfonated tallow ($C_{16-18}$); dihexyl sodium sulfo-succinate; and dibutyl sodium sulfo-succinate. The behavior of an agent in respect to the problem on hand is thus not a simple, clearly decipherable function of its surface-active qualities.

I claim as my invention:

1. As a new composition of matter, a castor-oil soluble grade of Victoria Pure Blue BO in intimate admixture with the sodium salt of dibutylated disulfonated ortho hydroxy diphenyl.

2. A composition of matter as in claim 1, the proportion of the sodium salt being from 4 to 20% based on the dry weight of the color.

3. A process for improving the stability against crystal growth of the castor-oil soluble grade of Victoria Pure Blue BO, which comprises incorporating therein the sodium salt of dibutylated disulfonated ortho hydroxy diphenyl.

4. A process for improving the stability against crystal growth of the castor-oil soluble grade of Victoria Pure Blue BO, which comprises incorporating into the wet, salted-out color, prior to drying, from 4 to 20% by weight (based on the weight of dry color) of the sodium salt of dibutylated disulfonated ortho hydroxy diphenyl, and then drying the mixture under vacuum.

LUTHER C. CHIEN.

References Cited in the file of this patent

UNITED STATES PATENTS

| Number | Name | Date |
|---|---|---|
| 2,135,978 | Magoun | Nov. 8, 1938 |
| 2,422,445 | Stryker et al. | June 17, 1947 |
| 2,519,210 | Wingate et al. | Aug. 15, 1950 |